US009628508B2

(12) United States Patent
Turbin

(10) Patent No.: US 9,628,508 B2
(45) Date of Patent: Apr. 18, 2017

(54) DISCOVERY OF SUSPECT IP ADDRESSES

(71) Applicant: F-Secure Corporation, Helsinki (FI)

(72) Inventor: Pavel Turbin, Helsinki (FI)

(73) Assignee: F—Secure Corporation, Helsinki (FI)

( * ) Notice: Subject to any disclaimer, the term of this patent is extended or adjusted under 35 U.S.C. 154(b) by 0 days.

(21) Appl. No.: 14/395,139

(22) PCT Filed: Mar. 15, 2013

(86) PCT No.: PCT/EP2013/055392
§ 371 (c)(1),
(2) Date: Oct. 17, 2014

(87) PCT Pub. No.: WO2013/156220
PCT Pub. Date: Oct. 24, 2013

(65) Prior Publication Data
US 2015/0074807 A1     Mar. 12, 2015

(30) Foreign Application Priority Data

Apr. 20, 2012 (GB) .................................. 1206935.7

(51) Int. Cl.
*H04L 29/06* (2006.01)
(52) U.S. Cl.
CPC ........ *H04L 63/145* (2013.01); *H04L 63/1416* (2013.01); *H04L 2463/144* (2013.01); *H04L 2463/146* (2013.01)
(58) Field of Classification Search
None
See application file for complete search history.

(56) References Cited

U.S. PATENT DOCUMENTS

| 8,056,132 B1 | 11/2011 | Chang et al. ................... 726/23 |
| 8,595,829 B1 * | 11/2013 | Kane ...................... G06F 21/552 726/22 |
| 8,682,812 B1 * | 3/2014 | Ranjan ................ H04L 63/1425 706/12 |
| 2004/0205419 A1 | 10/2004 | Liang et al. .................... 714/57 |

(Continued)

FOREIGN PATENT DOCUMENTS

| EP | 1 906 620 A1 | 4/2008 |
| EP | 2 009 858 A1 | 12/2008 |
| WO | WO 2007/002218 A1 | 1/2007 |

OTHER PUBLICATIONS

Dembskey, E., et al., "Towards an Intelligent Software Agent System as Defense Against Botnets", 6th International Conference on Information Warfare and Security, 2011, 9 pgs.

(Continued)

*Primary Examiner* — Kaveh Abrishamkar
(74) *Attorney, Agent, or Firm* — Harrington & Smith

(57) ABSTRACT

A method of discovering suspect IP addresses, the method including, at a client computer: monitoring the computer for malware; on detection of malware, obtaining a list of IP addresses with which a connection has been made or attempted at the client computer within a preceding time frame; sending the list of IP addresses to a central server; and receiving from the central server a blacklist of suspect IP addresses to allow the client computer to block connections with IP addresses within said blacklist.

16 Claims, 3 Drawing Sheets

(56) References Cited

U.S. PATENT DOCUMENTS

| | | | |
|---|---|---|---|
| 2005/0060535 A1* | 3/2005 | Bartas | H04L 63/145 713/154 |
| 2006/0288076 A1* | 12/2006 | Cowings et al. | 709/206 |
| 2009/0172815 A1 | 7/2009 | Gu et al. | 726/23 |
| 2010/0037314 A1* | 2/2010 | Perdisci | H04L 63/1416 726/22 |
| 2010/0162396 A1 | 6/2010 | Liu et al. | 726/23 |
| 2010/0251329 A1* | 9/2010 | Wei | H04L 63/1408 726/1 |
| 2011/0047620 A1* | 2/2011 | Mahaffey et al. | 726/23 |
| 2011/0055925 A1 | 3/2011 | Jakobsson | 726/25 |
| 2011/0154492 A1 | 6/2011 | Jeong et al. | 726/23 |
| 2012/0054869 A1* | 3/2012 | Yen | H04L 29/12066 726/24 |
| 2012/0110633 A1* | 5/2012 | An | H04L 63/1408 726/1 |
| 2013/0097699 A1* | 4/2013 | Balupari | G06F 21/552 726/22 |
| 2014/0351934 A1* | 11/2014 | Mitra | G06F 21/567 726/23 |

OTHER PUBLICATIONS

Fukushima, Y., et al., "Proactive Blacklisting for Malicious Web Sites by Reputation Evaluation Based on Domain and IP Address Registration", © 2011 IEEE, 10 pgs.

Choi, H., et al., "Botnet Detection by Monitoring Group Activities in DNS Traffic", © 2007 IEEE, 6 pgs.

* cited by examiner

DISCOVERY OF SUSPECT IP ADDRESSES

TECHNICAL FIELD

The present invention relates to suspect IP addresses, and in particular to the discovery of suspect IP addresses, for example the discovery of IP addresses of botnet nodes.

BACKGROUND

A "botnet" is a collection of infected computer devices, each of which is known as a "bot" or "node", connected to a network such as the Internet. Computer devices that are connected to the Internet may be vulnerable to being recruited into a botnet. Computer devices can be recruited into a botnet in a number of ways, for example by a drive-by-download or Trojan-horse malware. Once a computer device has been recruited, a botnet controller will be able to make a connection to the computer device, and command it to perform malicious activities, for example attack other computer devices, host malicious websites, upload personal data or install other malicious modules on the device. The botnet controller will typically be able to command and control the whole botnet or any node (re-cruited computer device) within the botnet via for example IRC or HTTP. A connection can be made to a node through a number of pathways using the other nodes within the botnet. This means that if one connection attempt to a node is unsuccessful, the botnet controller should still be able to make a connection to that node via a different pathway. Of course, if the botnet controller is unable to make any connection to the node, then the effects of the botnet on that device will be negligible.

There are a number of existing prevention measures that are typically carried out to try and detect activities on a computer device that are indicative of botnet attacks or behaviour. One example is a network based intrusion detection system (NIDS). A NIDS is an independent platform that identifies intrusions by examining network traffic and monitoring multiple hosts. A NIDS gains access to network traffic by connecting to a network hub, network switch configured for port mirroring, or network tap. In a NIDS, sensors are typically located at choke points in the network to be monitored. Sensors capture all network traffic and analyze the content of individual packets for malicious traffic. Most results returned from the NIDS are from network packet analysis, but because NIDSs are typically heuristic in nature, they are not always reliable.

Protection of users' computer devices (client computers) can be made more effective by denying any connections to known compromised IP addresses. This could be done through Internet security software, for example F-Secure Internet Security™. However, a botnet may consist of a very large number of nodes, and an infected client computer may connect to a different node IP address each time a connection is made between the infected client computer and the rest of the botnet. Therefore, for software to have a high level of reliability against botnet attacks, it is required that all (or realistically as many as possible) compromised IP addresses within a botnet are known. Discovering all the compromised IP addresses for the nodes within a botnet is a challenging task. But if successful, it can provide much more reliable protection against botnet attacks by blocking connection attempts between a computer and the botnet.

Two existing methods of discovering botnets and their nodes are described in US2010/0162396 and US2011/0154492. For example, in US2011/0154492 the botnet detection system is provided in an Internet Service Provider's (ISP) network. Existence of a botnet will be detected based on network traffic information collected by botnet traffic collecting sensors within the ISP's network. Once a botnet is detected, it can be further analysed by the detection system using a number of analyzers, for example a botnet group analyzer, organization analyzer, behaviour analyzer etc. This further analysis is used to discover as many nodes within the botnet as possible. This method requires a complex detection system to be put in place by ISPs that monitors all network traffic. Then the analysis performed once a botnet has been detected can be very processor intensive. Once a botnet has been detected and analysed, malicious traffic that uses the botnet can then be isolated.

SUMMARY

It is an object of the present invention to provide a method of discovering suspect IP addresses. This can be achieved by crowd sourcing suspect IP addresses from a multiplicity of client computers on which malware has been detected.

According to a first aspect of the invention there is provided a method of discovering suspect IP addresses, the method comprising, at a client computer, monitoring the computer for malware; on detection of malware, obtaining a list of IP addresses with which a connection has been made or attempted at the client computer within a preceding time frame; sending the list of IP addresses to a central server; and receiving from the central server a blacklist of suspect IP addresses to allow the client computer to block connections with IP addresses within said blacklist.

Embodiments of the present invention may provide an improved method of detecting suspect IP addresses, in particular IP addresses corresponding to nodes within a botnet. This can result in improved blocking of botnet attacks and recruitment into botnets.

The method may further comprise, at the central server, on receiving the list of IP addresses from the client computer, removing safe IP addresses from the list, and adding the remaining suspicious IP addresses to a database, and sending a blacklist of suspect IP addresses to the client computer.

The step of removing safe IP addresses from the list at the central server may comprise comparing the IP addresses in the list with a predefined whitelist of safe IP addresses and removing any that match.

The method may further comprise at the central server applying a prevalence factor to the IP addresses in the list by determining the number of times an IP address within the list has been returned by other client computers, and using the prevalence factor to determine whether or not an IP address is safe.

The central server may receive lists of IP addresses from more than one client computers in a distributed client base.

The step of obtaining a list of IP addresses at the client computer may be carried out by a network tracing module.

The list of IP addresses may be obtained from one or more of the list comprising: locally installed antivirus software, a locally installed firewall, the local DNS cache, and the local network router.

The client computer may further include information with the list of IP addresses that indicates which of the IP addresses in the list were connected to or attempted to connect to by the detected malware.

The suspect IP addresses relating to malware may be IP addresses of nodes within a botnet.

The method may be carried out at the client computer by an antivirus computer program.

According to a second aspect of the invention there is provided a method of discovering suspect IP addresses, the method comprising, at each of a multiplicity of client computers within a distributed client base, monitoring the computer for malware; on detection of malware, obtaining a list of IP addresses with which a connection has been made or attempted at the client computer within a preceding time frame; and sending the list of IP addresses to a central server. Then at the central server, receiving the lists of IP addresses from the client computers; removing known safe IP addresses from the lists; and adding the remaining IP addresses to a database of suspicious IP addresses.

According to a third aspect of the invention there is provided a client computer comprising: a malware scanner for identifying malware present on the client computer; a network tracing module for determining a list of IP addresses with which a connection has been made or attempted at the client computer within a preceding time frame; and a transmitter for sending the obtained list of IP addresses to a central server upon detection of malware by the malware scanner.

The client computer may further comprise a process connection handler for matching with the IP addresses in the list to the processes on the client computer that utilised the connection with said IP address.

The client computer may further comprise a result filter for filtering out safe IP addresses from the list of IP addresses prior to it being sent to the central server.

According to a fourth aspect of the invention there is provided a central server for serving a multiplicity of client computers, the server computer system comprising: a receiver for receiving IP address lists from one or more of said client computers; at least one logic filter for filtering out safe IP addresses from the received lists; and a database of suspect IP addresses.

The at least one logic filter may comprise a white list and/or black list comparator.

The at least one logic filter may comprise a reverse DNS query handler.

The central server may be a web server or web server cluster.

DETAILED DESCRIPTION

As discussed above, present approaches for detecting botnets and their nodes are complex to implement. A detection system for detecting botnets must be deployed into a network (e.g. by an ISP) that monitors traffic within that network to detect suspicious traffic that may be indicative of a botnet. Monitoring large amounts of network traffic in this way is complex and requires a great deal of processing power to be carried out, often at great expense to the entity responsible for the botnet detection system.

A new method and apparatus will now be described, with reference to the figures, that can be used to distribute the detection efforts amongst local hosts within the network to more efficiently gather data on "suspect IP addresses", such as IP addresses at which botnet nodes are located. The method and apparatus presented here allows for multiple local hosts to contribute to botnet detection by providing information to a backend server located in the cloud, rather than having a dedicated botnet detection system.

Figure 1:
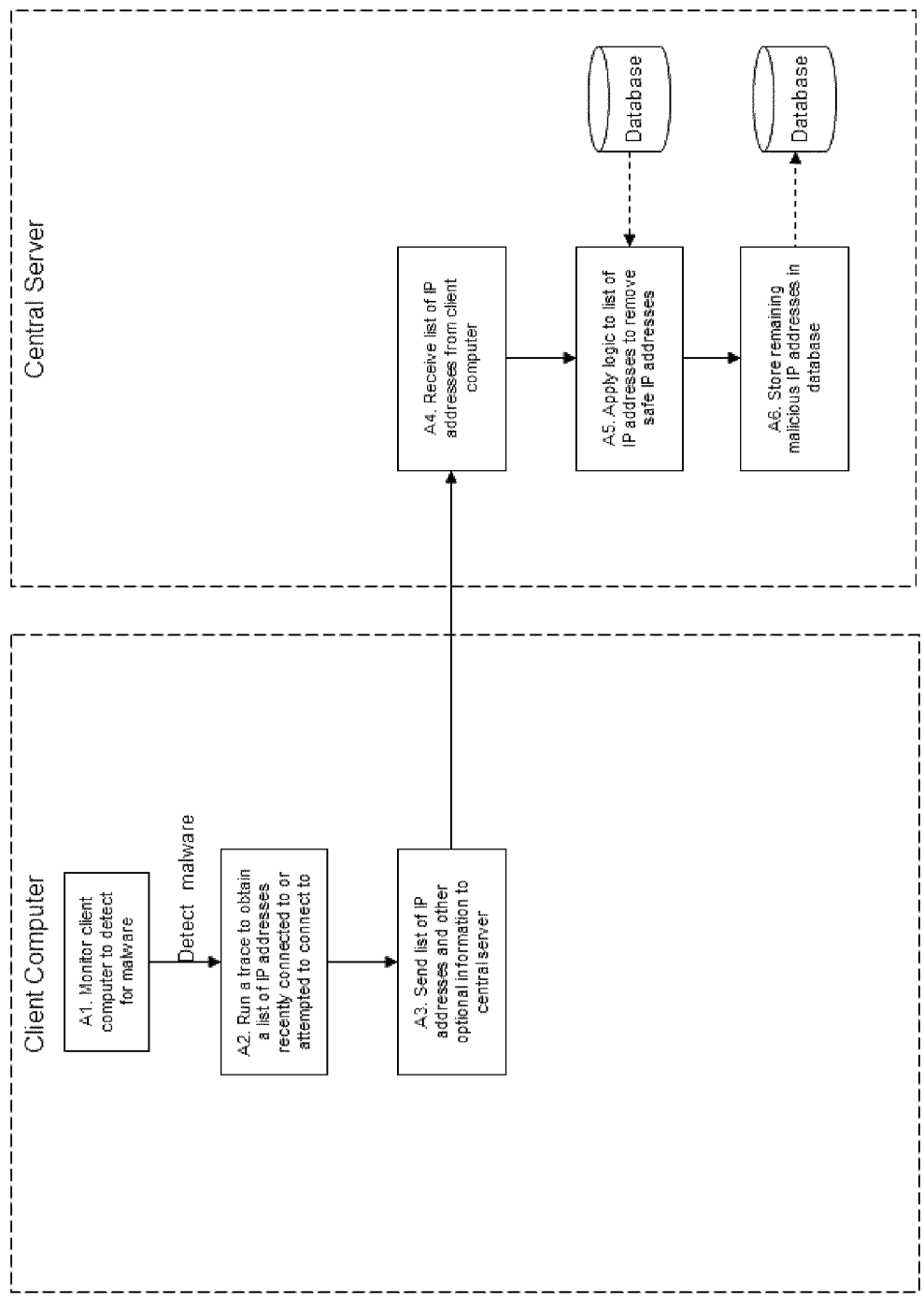
FIG. 1 is a flow diagram illustrating a method according to an embodiment.

FIG. 1 is a flow diagram illustrating a method according to one embodiment. The key steps of this method are as follows:

A1. The client computer is monitored for malware. This will typically be performed by locally installed antivirus software provided by an antivirus software provider, e.g. F-Secure Internet Security™.

A2. On detection of malware, a trace is run to obtain a list of the IP addresses with which a connection was recently made or attempted at the client computer. This can include both outgoing and incoming connections.

A3. The client computer sends the list of IP addresses to the central server. The information sent to the central server may further comprise other information, for example each IP address may be accompanied by an indication of the process that utilised the connection to that IP address.

A4. The central server receives the list of IP addresses (and any other information sent) from the client computer.

A5. Logic filters are then applied to the list of IP addresses. This will allow the central server to remove the safe IP addresses from the list, leaving only the suspect IP addresses. An example of a logic filter that can be applied to the IP addresses is a comparison of the IP addresses with a whitelist of known safe IP addresses (stored in a database at the central server). Further examples of other logic filters are described below.

A6. Once the safe IP addresses have been removed from the list of IP addresses received from the client computer, the remaining suspect IP addresses are stored in a database of known suspect IP addresses at the central server.

The suspect IP addresses stored in the database at the central server can be used in the future to aid in antivirus detection, and IP address blocking (e.g. in firewalls). It is likely that the central server will compile a blacklist of suspect IP addresses that will be provided to subscribers of the antivirus and/or internet security software to help protect their computers from botnet attacks. Updates to the blacklist can be sent out to users as part of, for example an antivirus definitions update.

Figure 2:
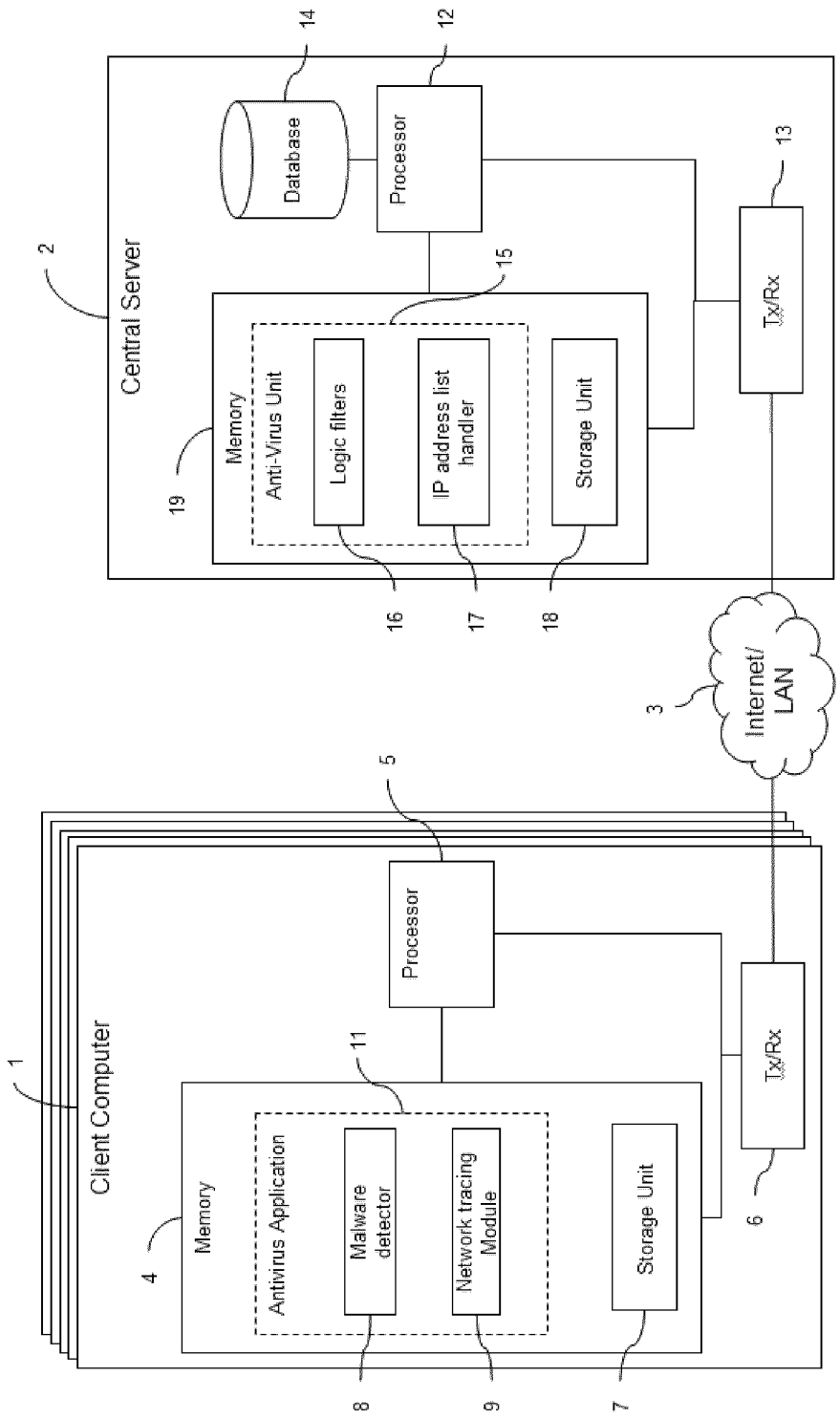
FIG. 2 illustrates schematically a computer system according to the embodiment of FIG. 1.

FIG. 2 illustrates schematically a computer system comprising at least one client computer 1 connected to a central server 2 over a network 3 such as the Internet or a LAN. The client computer 1 is implemented as a combination of computer hardware and software. A client computer 1 comprises a memory 4, a processor 5 and a transceiver 6. The memory 4 stores the various programs/executable files that are implemented by the processor 5, and also provides a storage unit 7 for any required data. The programs/executable files stored in the memory 4, and implemented by the processor 5, include a malware detector 8 (e.g. multiple scanning engines each with a different approach, e.g. heuristic, signature-based etc), and a network tracing module 9, both of which can be sub-units of an antivirus application 11. The transceiver 6 is used to communicate with the central server 2 over the network 3. Typically, the client computers 1 may be any of a desktop personal computer (PC), laptop, personal data assistant (PDA) or mobile phone, or any other suitable device.

The central server 2, which may be a single server or cluster of servers, is typically operated by the provider of the antivirus application 11 being run on the client computer 1. Alternatively, the central server 2 may be that of a network administrator or supervisor, the client computer 1 being part of the network for which the supervisor is responsible. The central server 2 is implemented as a combination of computer hardware and software. The central server 2 comprises a memory 19, a processor 12, a transceiver 13 and a database 14. The memory 19 stores the various programs/executable files that are implemented by the processor 12, and also provides a storage unit 18 for any required data. The programs/executable files stored in the memory 19, and implemented by the processor 12, include logic filters 16 and an IP address list handler 17, both of which can be sub-units of an anti-virus unit 15. These programs/units may be the same as those programs implemented at the client computer 1, or may be different programs that are capable of interfacing and co-operating with the programs implemented at the client computers 1. The transceiver 13 is used to communicate with the client computers 1 over the network 3.

The database 14 can be used to store suspect IP addresses, and may also be used to store IP address whitelists than can be used when filtering the results received from the client computers. The database may further store malware definition data, heuristic analysis rules, white lists, black lists etc which may be required by other aspects of the antivirus software. The database 14 can be populated with suspect IP addresses (e.g. IP addresses of nodes in a botnet) by the server using the method described above. This method can be seen as "crowd sourcing" the information from the large client base of the antivirus software provider. "Crowd sourcing" from the software provider's existing client base is an extremely efficient way of gathering suspect IP address data. The server 2 receives the lists of IP addresses from the client computers via transceiver 13, and stores it in storage unit 18. The IP address handler 17 will then perform a number of sorting and logic filtering techniques using logic filters 16 in order to remove the "clean" (i.e. non-suspect) IP addresses from the received lists. When a list has been filtered to the point that it only contains suspect IP addresses, the server 2 enters the remaining IP addresses (the suspect IP addresses) into the database 14.

An example of the method being carried out in practice will now be described in greater detail. Antivirus software is provided by an antivirus software provider to end users to install on their computers (client computers). This locally running antivirus software will block and remove malware from the client computer in accordance with the typical functions of such software. Another module to the antivirus software, or bolt-on, is provided by the software provider that enables the botnet node detection functionality. A detection of malware will trigger the bolt-on to start functioning. After the software has detected malware on the client computer, while the antivirus is performing the quarantine and/or removal of the malware from the client computer, the bolt-on obtains a list of the IP addresses with which a connection was recently made or attempted at the client computer, including both incoming and outgoing connections. A network tracing module within the software can be implemented using various existing network filtering technologies, for example those provided in Windows™ APIs, such as:

LSP filtering
    TDI filtering
    Windows Filtering Platform
    Event Tracing for Windows The Windows Filtering Platform was introduced as part of the Windows Vista™ OS and is well documented and reliable as a network filtering platform. Prior to Vista, network filtering was implemented using TDI or LSP. These are not documented by Microsoft™ but information on these APIs is publicly available, and both TDI and LSP are widely used in Firewalls.

As explained earlier, the bolt-on is triggered by detection of malware, and so it is already known that the client computer is infected. Therefore, there is a high probability that within the recent IP address connections obtained, there will be at least one connection made to a suspect IP address, for example an IP addresses of a botnet node or command and control (C&C) server. After the malware threat has been dealt with, the antivirus software can then upload the set of recent IP address connections to a central server maintained and run by the antivirus software provider for further analysis. The central server will typically be located on the Internet as a cloud solution.

The set of recent IP address connections might contain a mixture of both "clean" (i.e. not suspect) and suspect addresses. Logic filters at the server are then used to filter out the clean addresses from the list so only a list of "malicious" addresses remain.

Some filtering may also be carried out at the client computer prior to the list of IP addresses being sent to the central server. Some examples of the filtering that can be carried out at either the client computer, the central server, or both are:

- Filtering out known clean IP addresses by comparing the list of received IP addresses with a predefined whitelist of safe IP addresses. Any IP addresses that can be found in the whitelist will then be removed from the list received or being sent from the client computer.
- Performing a reverse DNS query. This will attempt to return a domain name, and if the returned domain name is known and trusted then the corresponding IP address can be removed from the list. For example, if a reverse DNS query converts an IP address in the list to "www.google.com", it can be removed from the list. Alternatively the filter may remove any IP address from the list if it has associated domain name.
- Filtering out IP addresses that have been commonly visited by the client computer during past sessions. For example this can be carried out by comparing an IP address with a list of IP addresses connected to over the past 14 days.
- If the IP address belongs to a user profile on the client computer, then this can also be dropped from the list. For example, IP addresses of other computers within a local private network, IP addresses representing a local HTTP proxy and/or IP addresses of default gateways, domain controllers and other management addresses.

In addition to the filtering out of clean IP addresses described above, logic performed at the central server can further be used to increase the "quality" of the received IP address set. For example, a prevalence factor may be applied to each IP address within the set. An IP address's prevalence factor will take into account the number of times that the IP address has been sent to the central server from all client computers. The same IP address returned from a large number of different infected client computers will increase the confidence of the decision taken.

Some logic may be applied at the client computer and/or at the central server. For example, consideration may be taken as to which processes on the client computer were attempting to utilise the connection with a given IP address. For example, an IP address that was used by a malicious process that was subsequently removed from the client computer by the antivirus software will be treated with a much higher level of suspicion, than IP addresses used by other processes on the client computer that were not removed by the antivirus software.

An advantage of this system over those described in the prior art is that, because it works in conjunction with existing antivirus software (or indeed is part of the antivirus software), a form of detection is already in place, and no additional complex botnet detection system is required. This also reduces the work required to be carried out by the central server. Instead of analysing a very large amount of network traffic, only a relatively small number of IP addresses need to be analysed. This crowd sourcing method is made possible as the central server will receive IP address list submissions from a large number of client computers because antivirus software providers typically have a large subscriber base. In the case of detecting nodes in a botnet, this leads to a high chance that the IP addresses of most, if not all, nodes within a botnet will be discovered.

Further situations that utilise the methods described will now be considered in detail.

Drive-by-Download Attacking

In this situation, malware is installed on a user's computer by exploiting a vulnerability. The malicious payload is therefore installed without the user's consent or knowledge. A real-time scanner (usually comprising a multitude of scanning engines each with a different approach, e.g. heuristic, signature-based etc) is run on the user's computer as part of an installed antivirus software and is capable of effectively stopping the attack by detecting the infected files that are saved to disk.

In order to be able to recall the connection to the C&C server where the malicious payload is being hosted, the antivirus software has a network tracing module that continuously runs, screening network connections and maintaining a log of all connections. The tracing module captures a snapshot of the recent connections for a certain period of time, for example for the past 30 minutes, 2 hours or one or more days. After the antivirus has prevented the exploitation attempt, e.g. by quarantining the malicious files that have been written to disk, it queries the connection trace from the network tracing module.

To increase the reliability of the information sent to the central server, and to reduce the workload required by the central server, the antivirus may exclude trivial connections before sending the connection information. For example, trivial connections that may be excluded could be:

1) IP addresses frequently visited by the user's computer based on past history,
2) connections from non-user accounts, and
3) local network connections.

Regarding connections from non-user accounts, there are usually multiple accounts running on a computer system: a user account, a network service and the local system. Connections from the network service and the local system are of no great interest as it is generally expected that it is the user account that is exploited by malware. This means that connections from non-user accounts can be regarded as trivial, and therefore filtered out.

Additionally, the antivirus may assign a weighting factor to each IP address within the list sent to the central server. For example, an IP address that was connected to from the malicious processes detected by the real-time scanner would be given a high weighting factor.

Removing a System Wide Infection where Antivirus was not Previously Installed

In this scenario, the user has previously kept the antivirus disabled or has specifically installed it to remove an infection. Due to the antivirus not previously running on the computer, the antivirus has been unable to run the network tracing module continuously for a long period of time. Therefore, the network tracing is activated as soon as the removal process begins with the expectation that the malware will make a connection to botnet while removal process is performed. In addition to the small amount of information that the newly installed network tracing module can pick up, the antivirus may be able to obtain information on the recent connections from other sources. Some examples of other sources from where this information may be obtained are:

locally installed firewall
local DNS cache
a local network router

Figure 3:
FIG. 3 shows a screenshot of an outgoing connection log returned from a router after being queried in a command line.

Locally installed firewalls may have the ability to log connections to IP addresses, but this will be dependent on the ability of the firewall installed and enabled on the client computer. The local DNS cache will contain useful information on recent connections and the antivirus software can query the cache requesting information on the connection history for a specified period of time. The third option, a local network router, will again be dependent on the hardware in place. In addition, the router may require user credentials such as an administrator username and password in order to access the desired connection log. FIG. 3 shows a screenshot of an outgoing connection log returned from a router after being queried in a command line.

It will be appreciated by the person of skill in the art that various modifications may be made to the above described embodiments without departing from the scope of the present invention.

The invention claimed is:

1. A method of discovering suspect IP addresses, the method comprising:
   at a client computer:
      monitoring the client computer for malware;
      in response to detection of malware operating on the client computer, triggering the client computer to obtain a list of IP addresses, the IP addresses being IP addresses with which a connection has been made or attempted at the client computer within a preceding time frame;
      sending the list of IP addresses to a central server;
      receiving from the central server a blacklist of suspect IP addresses, wherein the blacklist of suspect IP addresses is based at least on the list of IP addresses; and
      blocking connections with IP addresses within said blacklist.

2. A method as claimed in claim 1, further comprising, at the central server:
   on receiving the list of IP addresses from the client computer, removing safe IP addresses from the list,
   adding the remaining suspicious IP addresses to a database, and sending a blacklist of suspect IP addresses to the client computer.

3. A method as claimed in claim 2, wherein the step of removing safe IP addresses from the list at the central server comprises comparing the IP addresses in the list with a predefined whitelist of safe IP addresses and removing any that match.

4. A method as claimed in claim 2, further comprising at the central server applying a prevalence factor to the IP addresses in the list by determining the number of times an IP address within the list has been returned by other client computers, and using the prevalence factor to determine whether or not an IP address is safe.

5. A method as claimed in claim 2, wherein the central server receives lists of IP addresses from more than one client computers in a distributed client base.

6. A method as claimed in claim 1, wherein the step of obtaining a list of IP addresses at the client computer is carried out by a network tracing module.

7. A method as claimed in claim 1, wherein the list of IP addresses is obtained from one or more of the list comprising: locally installed antivirus software, a locally installed firewall, the local DNS cache, and the local network router.

8. A method as claimed in claim 1, wherein the client computer further includes information with the list of IP addresses that indicates which of the IP addresses in the list were connected to or attempted to connect to by the detected malware.

9. A method as claimed in claim 1, wherein the suspect IP addresses relating to malware are IP addresses of nodes within a botnet.

10. A method as claimed in claim 1, wherein the method is carried out at the client computer by an internet security computer program.

11. A method according to claim 1, and comprising, at the client computer, prior to sending the list of IP addresses:
performing a reverse DNS lookup on each IP address of the list of IP addresses to obtain domain names associated with the IP addresses;
removing any IP addresses associated with known and trusted domain names from the list.

12. A method of discovering suspect IP addresses, the method comprising:
at each of a multiplicity of client computers within a distributed client base: monitoring the client computer for malware;
in response to detection of malware operating on the client computer, triggering the client computer to obtain a list of IP addresses, the IP addresses being IP addresses with which a connection has been made or attempted at the client computer within a preceding time frame; and
sending the list of IP addresses to a central server; then at the central server:
receiving the lists of IP addresses from the client computers;
removing known safe IP addresses from the lists;
adding the remaining IP addresses to a database of suspicious IP addresses; and
sending a blacklist of IP addresses to the client computers, wherein the blacklist is based at least in part on the suspicious IP addresses,
wherein the client computers block connections with IP addresses within said blacklist.

13. A client computer comprising:
a processor; and
a non-transitory memory including computer program code, wherein the memory and computer program code are configured to, with the processor, cause the client computer at least to:
monitor the client computer for malware;
in response to detection of malware operating on the client computer, trigger the client computer to obtain a list of IP addresses, the IP addresses being IP addresses with which a connection has been made or attempted at the client computer within a preceding time frame;
send the obtained list of IP addresses to a central server;
receive from the central server a blacklist of suspect IP addresses, wherein the blacklist of suspect IP addresses is based at least on the list of IP addresses; and
block connections with IP addresses within said blacklist.

14. A client computer as claimed in claim 13, wherein the memory and computer program code are further configured to, with the processor, cause the client computer at least to match the IP addresses in the list to the processes on the client computer that utilised the connection with said IP address.

15. A client computer as claimed in claim 13, wherein the memory and computer program code are further configured to, with the processor, cause the client computer at least to: filter out safe IP addresses from the list of IP addresses prior to it being sent to the central server.

16. A client computer according to claim 13, wherein the memory and computer program code are further configured to, with the processor, cause the client computer at least to: prior to sending the list of IP addresses:
perform a reverse DNS lookup on each IP address of the list of IP addresses to obtain domain names associated with the IP addresses;
remove any IP addresses associated with known and trusted domain names from the list.

* * * * *